(12) United States Patent
White et al.

(10) Patent No.: US 8,635,946 B2
(45) Date of Patent: Jan. 28, 2014

(54) COFFEE MAKER WITH SINGLE SERVE SETTING

(75) Inventors: Gerard Andrew White, Darlinghurst (AU); Daniel Serra, Richmond (AU)

(73) Assignee: Breville Pty Limited, Botany, New South Wales (AT)

( * ) Notice: Subject to any disclaimer, the term of this patent is extended or adjusted under 35 U.S.C. 154(b) by 884 days.

(21) Appl. No.: 12/526,949

(22) PCT Filed: Feb. 13, 2008

(86) PCT No.: PCT/AU2008/000187
§ 371 (c)(1),
(2), (4) Date: Aug. 13, 2009

(87) PCT Pub. No.: WO2008/098296
PCT Pub. Date: Aug. 21, 2008

(65) Prior Publication Data
US 2010/0011964 A1    Jan. 21, 2010

(30) Foreign Application Priority Data

Feb. 13, 2007   (AU) ................................ 2007900705

(51) Int. Cl.
*A47J 31/06*    (2006.01)
(52) U.S. Cl.
USPC ............ 99/299; 99/279; 99/304; 99/306; 99/307
(58) Field of Classification Search
USPC .......... 99/279, 280, 300, 297, 304–305, 306, 99/299, 282–283, 307

IPC ................................................ A47J 31/46,31/57
See application file for complete search history.

(56) References Cited

U.S. PATENT DOCUMENTS

| | | | | |
|---|---|---|---|---|
| 4,467,707 | A * | 8/1984 | Amiot | 99/279 |
| 4,667,587 | A * | 5/1987 | Wunder | 99/295 |
| 4,790,240 | A * | 12/1988 | Henn et al. | 99/282 |
| 4,811,657 | A * | 3/1989 | Rixen | 99/295 |
| 4,893,552 | A * | 1/1990 | Wunder et al. | 99/299 |
| 5,063,837 | A * | 11/1991 | Precht | 99/295 |
| 5,133,247 | A * | 7/1992 | Pastrick | 99/295 |
| 5,168,794 | A * | 12/1992 | Glucksman | 99/295 |
| 5,251,541 | A * | 10/1993 | Anson et al. | 99/280 |
| 5,325,764 | A * | 7/1994 | Nakamura et al. | 99/282 |
| 5,515,771 | A * | 5/1996 | Smit | 99/280 |
| 5,619,904 | A * | 4/1997 | Di Nunzio et al. | 99/295 |
| 5,687,636 | A * | 11/1997 | Diore et al. | 99/285 |
| 5,687,637 | A * | 11/1997 | Brookshire et al. | 99/295 |
| 5,699,719 | A * | 12/1997 | Lucas et al. | 99/299 |
| 5,813,319 | A * | 9/1998 | Lee | 99/299 |
| 5,865,095 | A * | 2/1999 | Mulle | 99/293 |
| 5,957,036 | A * | 9/1999 | Warner et al. | 99/299 |

(Continued)

FOREIGN PATENT DOCUMENTS

| | | | | |
|---|---|---|---|---|
| DE | 3705430 A1 * | 9/1988 | | A47J 31/46 |
| NL | 1002420 C2 * | 8/1997 | | A47J 31/46 |

*Primary Examiner* — Gene Kim
*Assistant Examiner* — Matthew B Stanczak
(74) *Attorney, Agent, or Firm* — Michael Molins (57) ABSTRACT

A coffee maker comprises a filter basket assembly that enables two coffee dispensing modes. The assembly comprises a filter basket, an actuator that cooperates with a carafe and a motor driven valve. The actuator stops coffee from dispensing when the carafe is removed, but can be defeated by the user to dispense into a cup or mug when the carafe is absent.

9 Claims, 11 Drawing Sheets

(56) References Cited

U.S. PATENT DOCUMENTS

| | | | |
|---|---|---|---|
| 5,970,849 A * | 10/1999 | Baumann et al. | 99/299 |
| 6,164,191 A * | 12/2000 | Liu et al. | 99/305 |
| RE37,173 E * | 5/2001 | Jefferson et al. | 99/299 |
| 6,374,725 B1 * | 4/2002 | Leung | 99/293 |
| 6,550,370 B2 * | 4/2003 | Dam et al. | 99/280 |
| 7,013,795 B2 * | 3/2006 | Mulle et al. | 99/286 |
| 7,024,984 B2 * | 4/2006 | Leung et al. | 99/299 |
| 7,047,869 B2 * | 5/2006 | Leung et al. | 99/304 |
| 7,836,820 B2 * | 11/2010 | Hammad | 99/299 |
| 2002/0083844 A1 * | 7/2002 | Dam et al. | 99/307 |
| 2008/0282896 A1 * | 11/2008 | Andrew et al. | 99/280 |
| 2009/0031900 A1 * | 2/2009 | Barraclough et al. | 99/280 |

\* cited by examiner

Fig. 13

COFFEE MAKER WITH SINGLE SERVE SETTING

FIELD OF THE INVENTION

This invention relates to coffee makers, more particularly, coffee makers that can dispense into a carafe or into a cup or mug.

BACKGROUND OF THE INVENTION

In some coffee makers, brewed coffee is dispensed into a carafe where the coffee is collected. Dispensing when the carafe is not in place can create household mess. Therefore, a feature providing an interruption in coffee dispensing, when the carafe is not in place, is desirable.

On the other hand, users may want to use a coffee maker with a coffee cup or mug instead of a carafe. Therefore, it is desirable to have a coffee maker that allows discharge into a cup or mug when the carafe is not present.

OBJECTS AND SUMMARY OF THE INVENTION

It is an object of the present technology to provide a coffee maker that is equipped with a user selection feature that permits single serve coffee discharge even when the carafe is not in place.

It is another object of the invention to provide a coffee maker that reverts to a carafe setting from a single serve setting when a carafe is inserted.

BRIEF DESCRIPTION OF THE DRAWING FIGURES

In order that the invention be better understood, reference is now made to the following drawing figures in which.

BEST MODE AND OTHER EMBODIMENTS

Figure 1A:
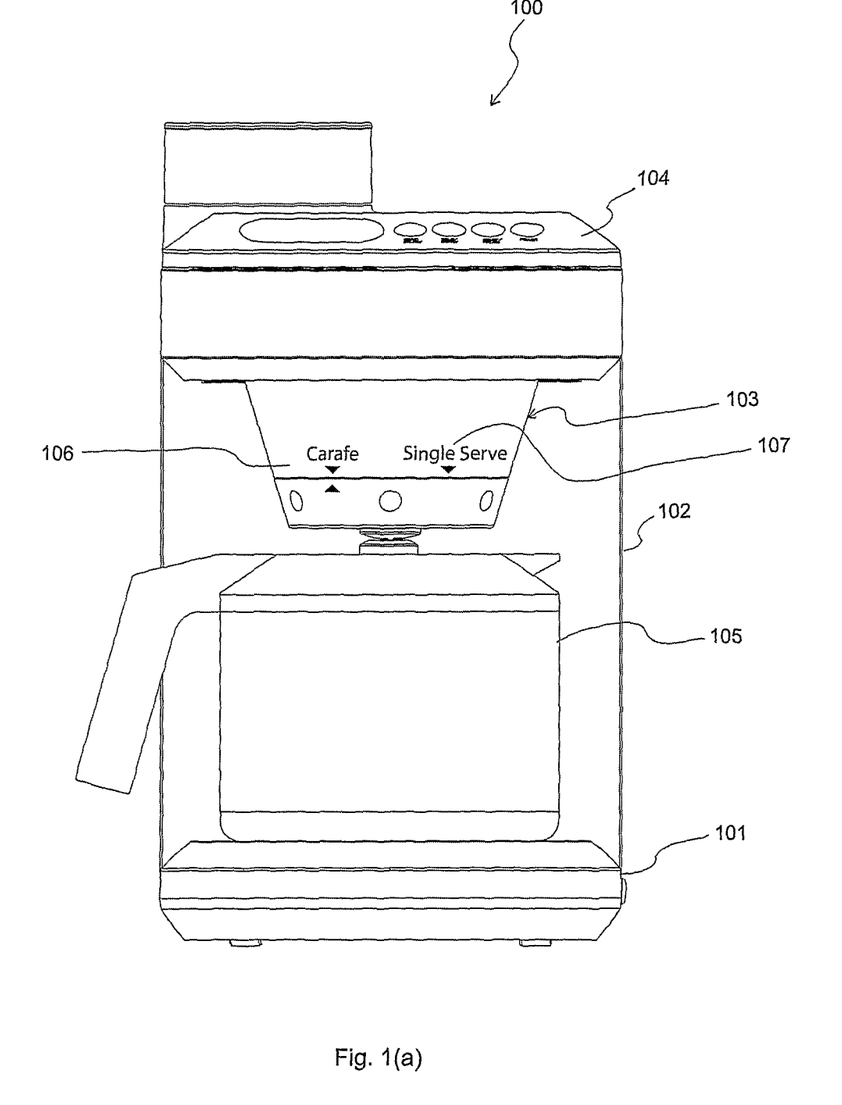
FIG. 1(a) is a front elevation view of the coffee maker and a cooperating carafe.
Figure 1B:
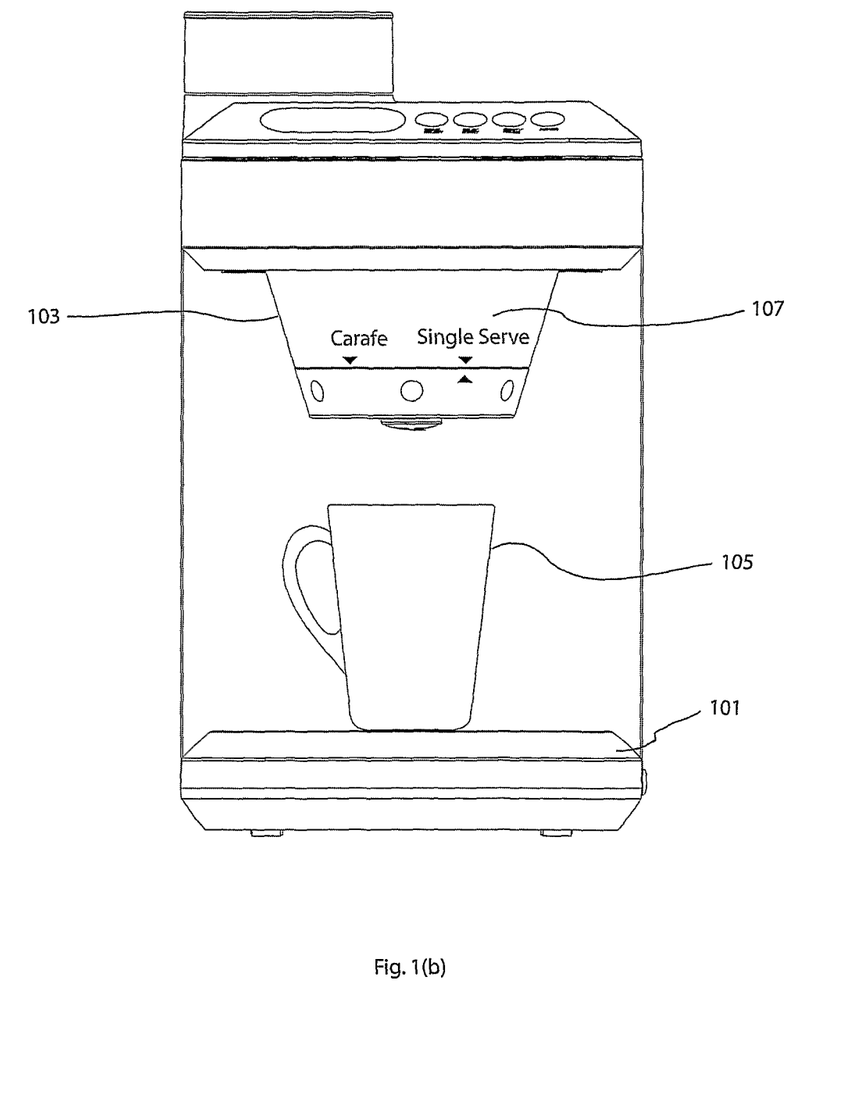
FIG. 1(b) is a front elevation view of the coffee maker and a mug.

Referring to FIG. 1(a), the coffee maker 100 of this example comprises a base 101, a reservoir 102 for liquids, a filter assembly 103 for brewing and dispensing coffee, and a display and control panel 104. A carafe 105 cooperates with the coffee maker 100. The coffee maker 100 is operable two modes. One mode is a 'carafe' mode 106, in which the carafe 105 must push against an actuator in a prescribed manner, as will be explained, for the coffee to be dispensed. The coffee maker is further operable in a 'single serve' mode 107. In the single serve mode 107, the coffee is dispensed even when the container placed on the base 101 does not reach the filter assembly 103, as depicted in FIG. 1(b).

Figure 2:
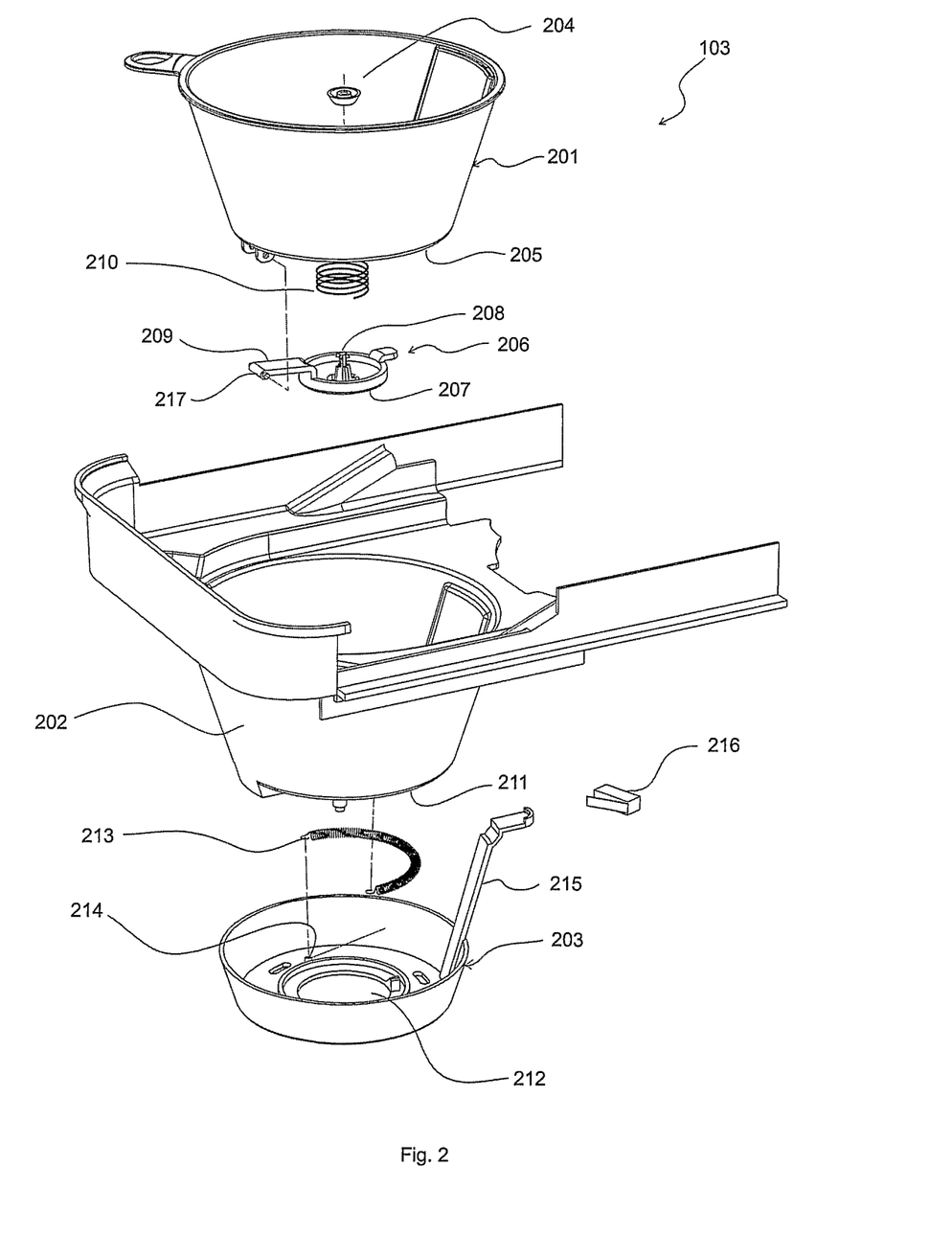
FIG. 2 is an exploded perspective view showing the filter basket, basket retainer, and the selection dial.
Figure 3:
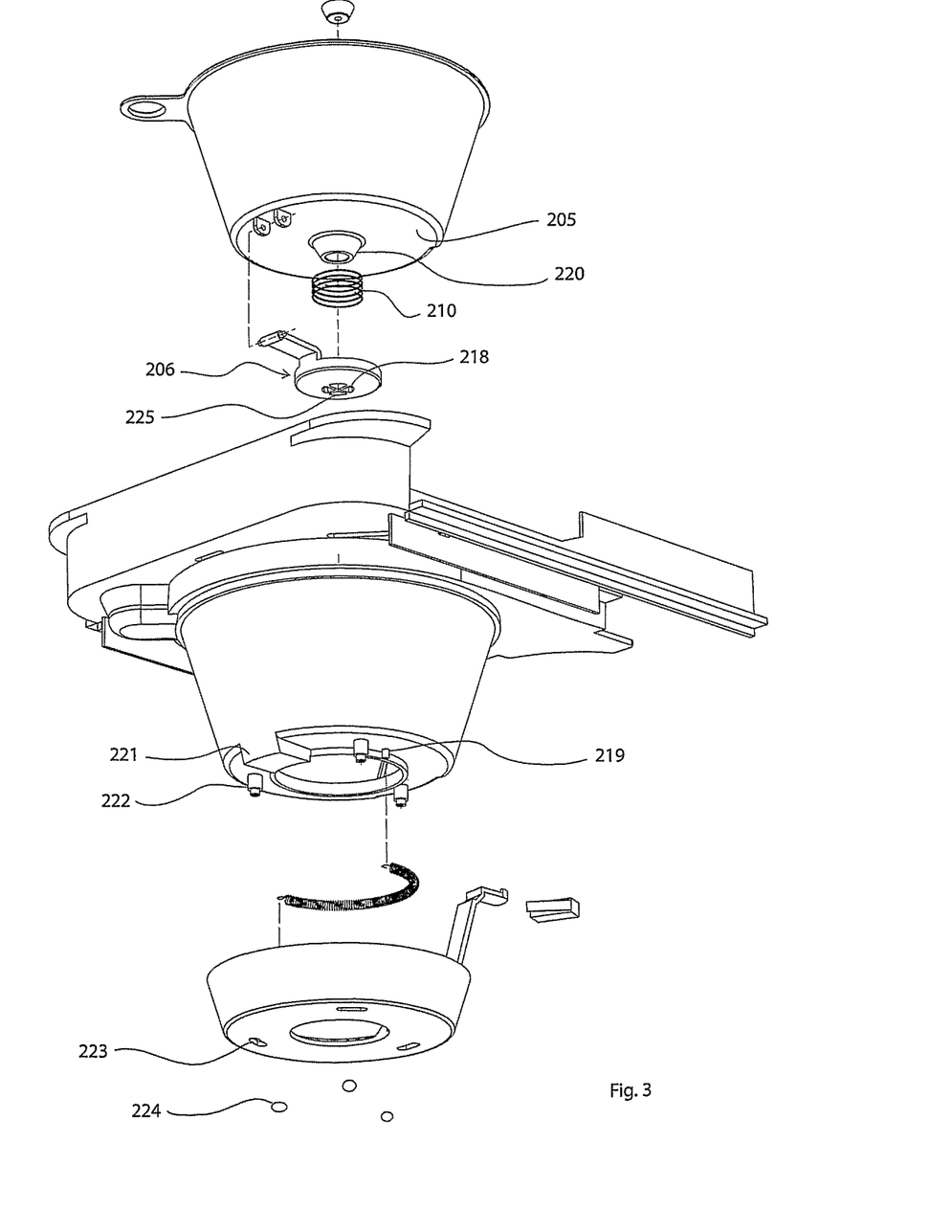
FIG. 3 is another exploded perspective view showing the filter basket, the basket retainer, and the selection dial.

Referring to FIGS. 2 and 3, the primary components of the filter assembly 103 are a filter basket body 201, a fixed or sliding-drawer style basket retainer 202 that carries the basket 201, and a user operated mechanical arrangement, in this example being a rotating selection dial 203 and the associated mechanical components (and optional electrical indicator) for users to switch the mode of operation.

Further referring to FIGS. 2 and 3, brewed coffee output from the filter basket 201 is controlled by the position of a tapered pause valve plug 204 that is located in a tapered through opening 220 formed in the bottom 205 of the basket 201. The extent to which the valve plug 204 clears the through opening 220 depends on the position of the valve plug 204. A full clearance of the valve plug 204 from the through opening 220 causes the coffee maker to dispense coffee at a higher rate. A partial clearance of the valve plug 204 from the through opening 220 causes the coffee maker to dispense coffee at a slower rate. In some embodiments, the valve plug 204 only partially clears the through opening 220.

A pause valve actuator 206 is carried by the bottom surface 205 of the basket 201. The actuator 206 has a circular rim 207. In this example, the actuator's rim 207 covers the basket's opening 220. A stem with plug retainer 208 is located within the rim 207. The valve plug or member 204 is fitted onto the plug retainer 208. One or more through openings 218 are formed through the central portion of actuator 206. In this embodiment, the through openings 218 are separated by webs 225. The plug retainer is carried by the webs 225. In this example, four through or discharge openings 218 are provided.

The actuator 206 in this embodiment further has a vertically offset arm 209 that extends from the rim 207 and terminates in a hinge portion 217 that is carried by the basket's bottom surface 205. This arm 209 is received within a pocket 221 that extends from the basket retainer 202. The pocket 221 is sized to accommodate the swinging movements of the arm 209.

A pause valve compression spring 210 is located between the basket's bottom surface 205 and the actuator 206, surrounding the retainer 208. The spring 210 biases the valve plug 204 into the basket's through opening 220.

When the valve plug 204 does not block the basket's tapered opening 220, the brewed coffee passes through and is funnelled toward the actuator 206. Since the basket's opening 220 is smaller than the rim 207, coffee passes through the actuator's openings 218. When the valve plug 204 blocks the basket's opening 220, coffee is retained within the filter basket 201, and is not dispensed.

A rotating selection dial 203 is located beneath the basket retainer 209. The selection dial 203 further comprises a central opening 212 that is large enough to accommodate the actuator's rim 207. A dial return tension spring 213 extends between a first return spring post 219 carried by the basket's bottom 211 and a second return spring post 214 located besides the dial's central opening 212. The selection dial 203 may have a dial arm 215 that extends radially outward and is adapted to activate a micro-switch 216. The switch 216 may activate an electronic feature such as an indicator light that displays the current mode of operation or a warning. The return spring 213 biases the rotation of the selection dial 203 toward the carafe mode of operation.

In this example, the basket retainer 202 has three dial retaining or fastening posts 222 that are received by cooperating arc-shaped through openings 223 formed in the selection dial 203. In this embodiment, the through openings 223 are located around the central opening 212 of the selection dial 203.

Figure 4:
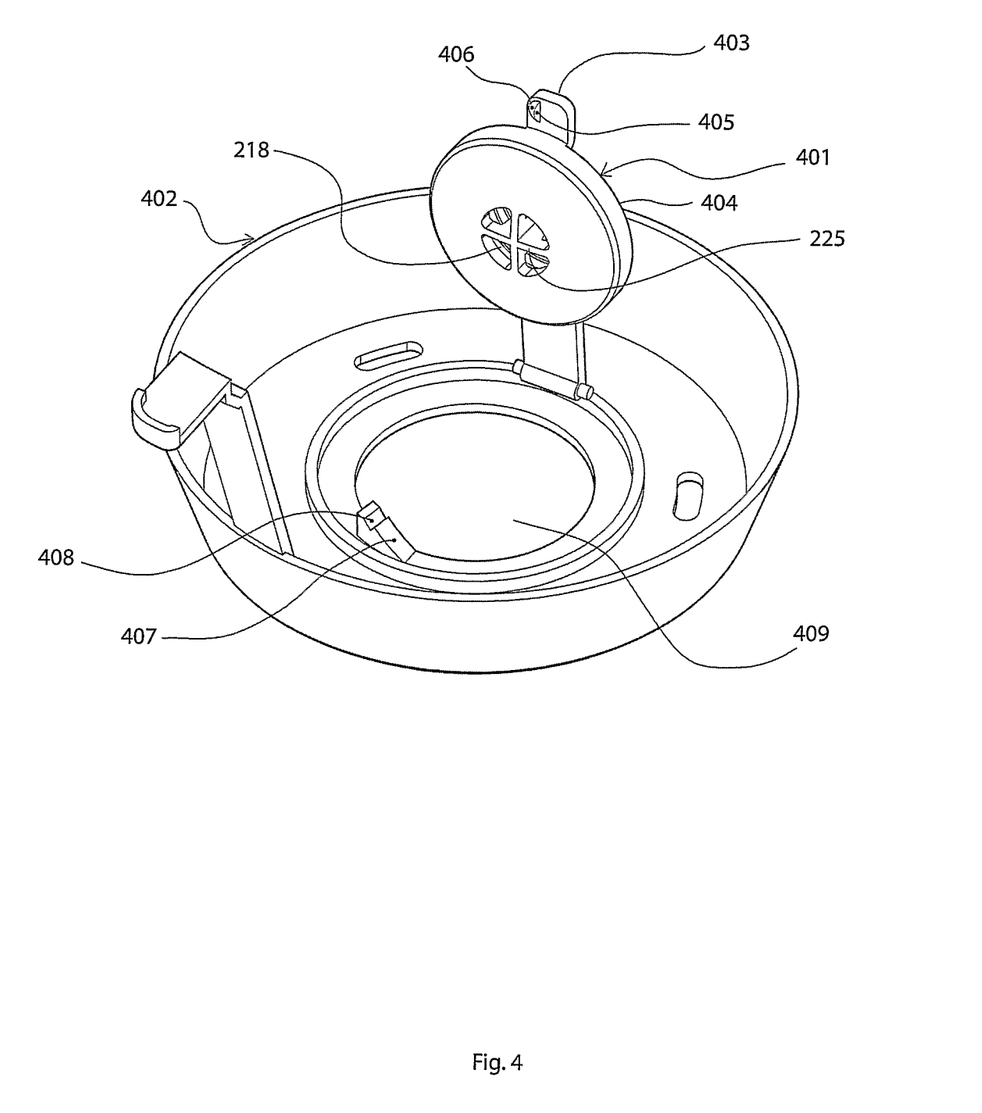
FIG. 4 is a perspective view of the selection dial and the pause valve actuator.

Referring to FIG. 4, the pause valve actuator 401 and the selection dial 402 have cooperating cam features.

In this embodiment, the pause valve actuator 401 has a flat tab 403 that extends outwardly from the actuator's outer rim 404. The tab 403 carries a male reset detail 405 that extends perpendicularly from the tab 403. The male reset detail 405 has a sloped face 406 that acts as a cam slave. A ramp 407 is located beside the selection dial's central opening 408, and extends vertically away from the surface in which the opening 408 is formed. Because the actuator 401 is pivoted toward the selection dial 402 by the spring 210, the male reset detail 405 comes in contact with the ramp 407. The ramp 407 acts as a cam driver. The cam slave 406 is sloped so as to travel smoothly along the cam driver 408. A detent is formed into the ramp 407. This detent or female reset detail 409 is adapted to cooperate with the male reset detail 405.

Figure 5:
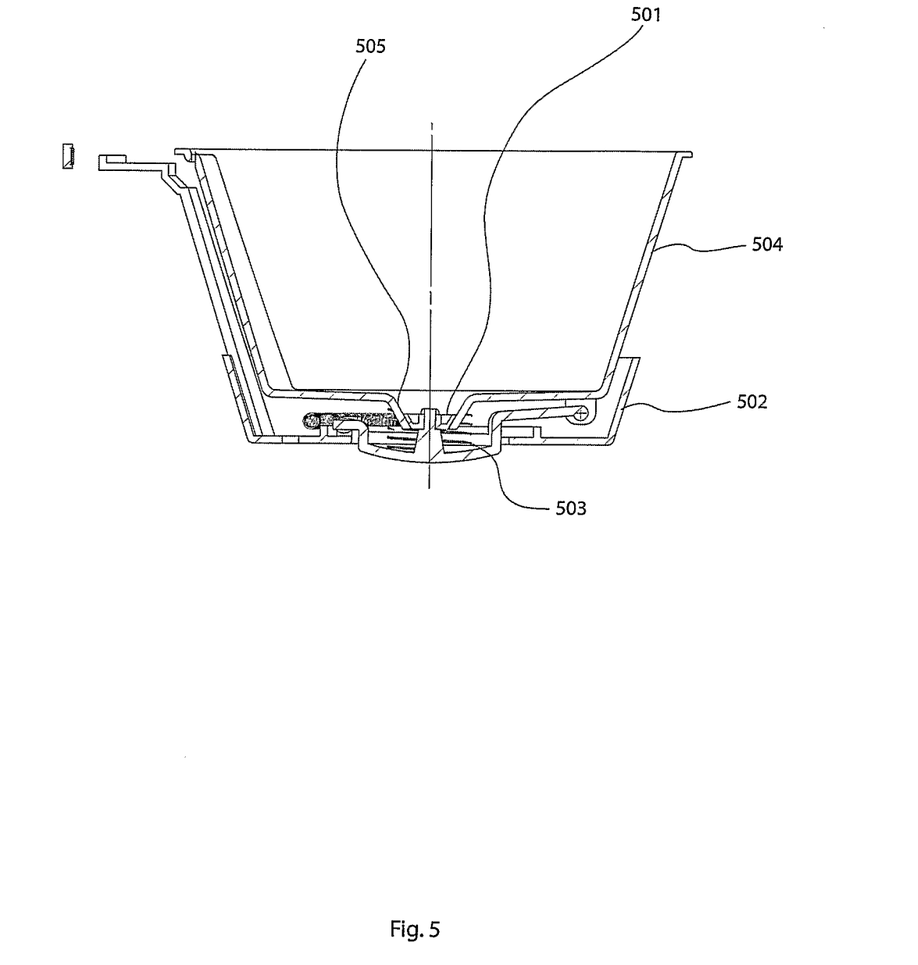
FIG. 5 is a cross sectional view of the selection dial and the pause valve actuator, with the pause valve in the closed carafe position.
Figure 6:
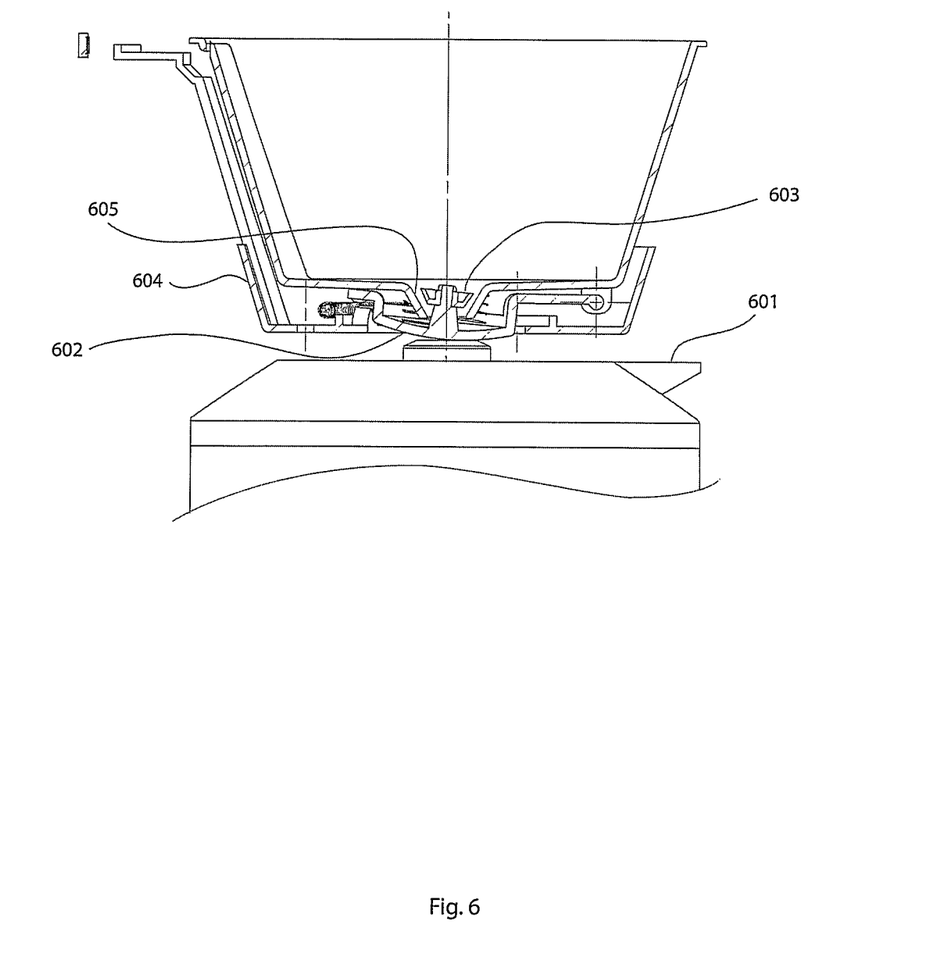
FIG. 6 is a cross sectional view of the filter basket, showing the pause valve actuator in the open carafe position.

FIGS. 5 and 6 depict the carafe mode operation of the coffee maker. As shown in FIG. 5, the valve plug 501 is "normally closed", e.g. biased into the basket opening 220 by the pause valve compression spring 503, and hence seals the filter basket's opening 505. As shown in FIG. 6, the top of the carafe 601 pushes against the valve actuator 602. The pause valve plug 603 is lifted away from the bottom of the filter basket 604, unblocking the basket's opening 605. Coffee can exit the basket 604 and be dispensed from the actuator 602.

Figure 7:
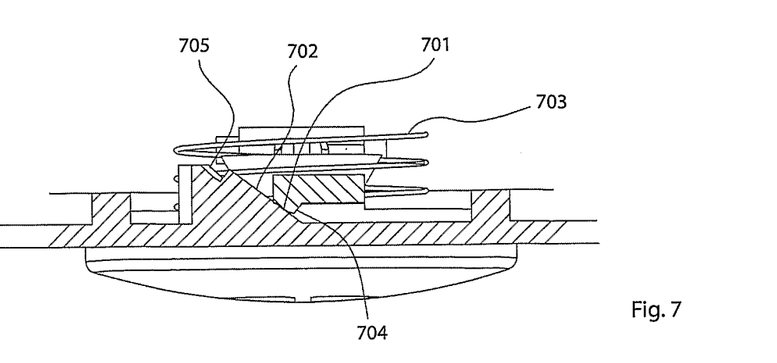
FIG. 7 is a cross sectional view of the filter basket and the selection dial in the closed carafe position, showing the cam faces.
Figure 8:
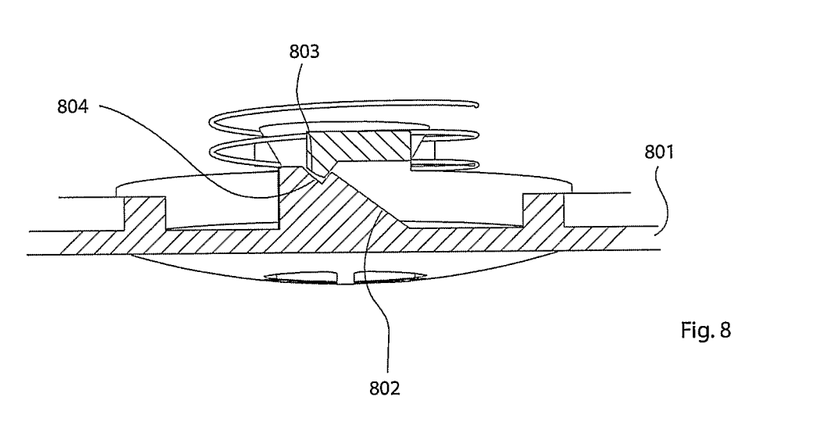
FIG. 8 is a cross sectional view showing the engagement between the male and female reset details.
Figure 9:
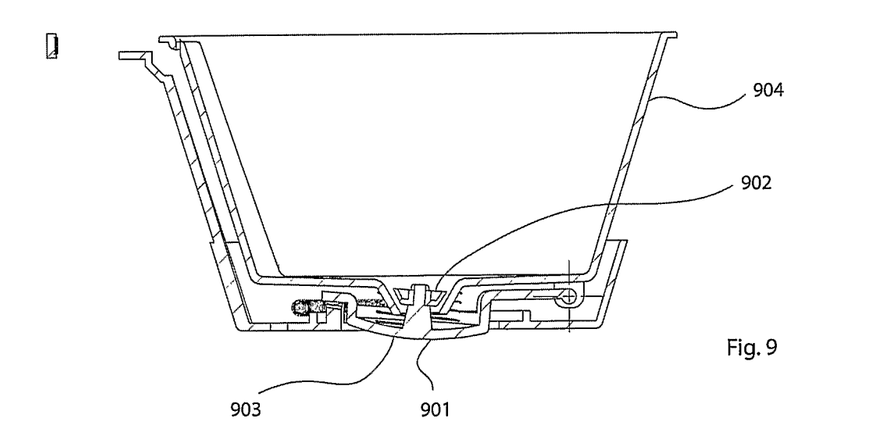
FIG. 9 is a cross section view showing the filter basket, the selection dial, and the pause valve actuator, with the pause valve in the single serve position.

FIGS. 7 to 9 depict the transition between the carafe mode and the single serve mode. As shown in FIG. 7, when in the carafe mode, the cam slave 701 is positioned toward the bottom of the cam driver 702.

Referring to FIG. 8, the selection dial 801 is rotated from the carafe mode to the single serve mode. The cam driver 802 hence rotates, creating a relative vertical travel of the cam slave 803 toward the female reset detail 804. The cam travel is complete when the male reset detail 804 engages the female reset detail 804. The engagement and interference between the reset details prevents the return spring (not shown) from rotating the selection dial 801 back to the carafe position.

As shown in FIG. 9, the pause valve actuator 901 is lifted about its pivot during the aforementioned rotation. In preferred embodiments, the valve plug 902 partially clears the output opening 903 of the filter basket 904, allowing brewed coffee to be dispensed from the openings in the actuator 901 at a slower rate than in the carafe mode The slower dispensing rate improves the flavour of the dispensed coffee in the single serve mode.

Figure 10:
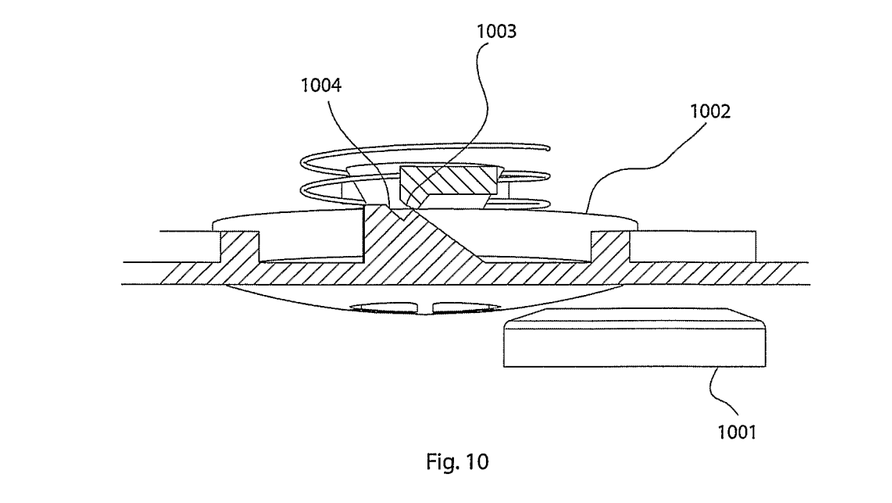
FIG. 10 is a cross sectional view showing the disengagement of the mail reset detail away from the female reset detail.
Figure 11:
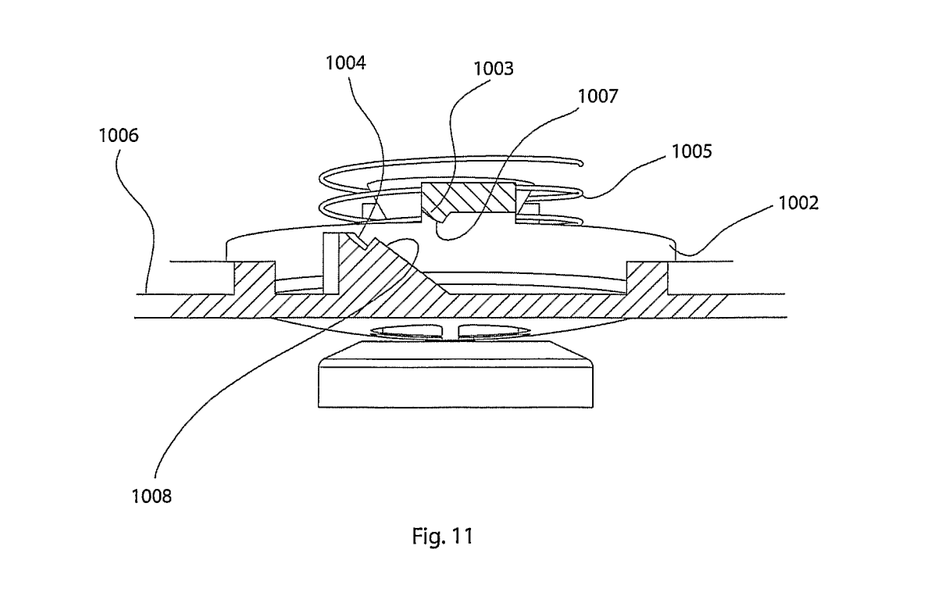
FIG. 11 is a cross sectional view showing the male and female reset details in the carafe open position.

FIGS. 10 and 11 depict the return from the single serve mode to the carafe mode. Referring to FIG. 10, as the carafe 1001 impinges upon or pushes against the valve actuator 1002, the male reset detail 1003 clears the female reset detail 1004. As shown in FIG. 11, the return spring (not shown) then moves the selection dial, and hence the female reset detail 1004, away from the male reset detail 1003. In this orientation coffee will be dispersed into the carafe. The bias of the pause valve compression spring 1005 draws the cam slave 1007 and the cam driver 1008 together, sealing the basket, when the carafe is removed. The coffee machine is thus reset to the carafe mode.

Figure 12:
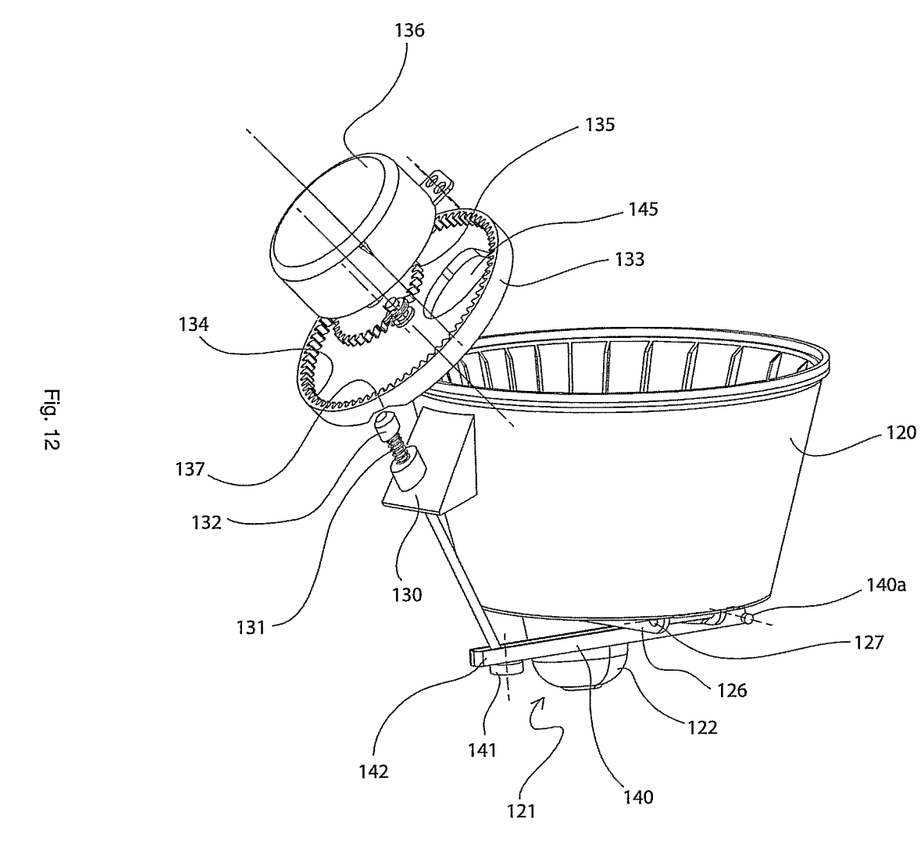
FIG. 12 is a perspective view of a further embodiment of the invention.
Figure 13:
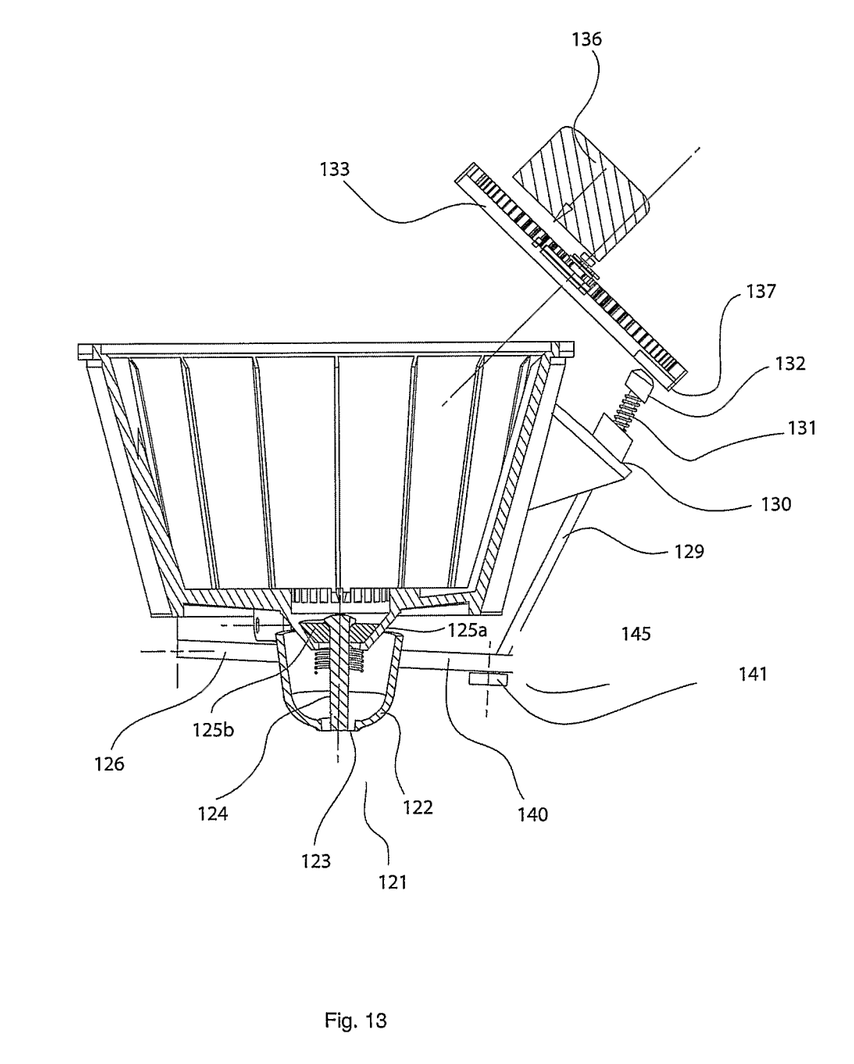
FIG. 13 is a cross section of the embodiment depicted in FIG. 12.

As shown in FIGS. 12 and 13, a further embodiment of the invention utilises an electric motor to operate the discharge valve of a filter basket (or filter basked retainer). As shown in FIGS. 12 and 13, a filter basket body 120 further comprises a lower surface in which is formed a discharge valve assembly 121. The valve assembly 121 comprises a conical valve seat 125a that is selectively blocked by a similarly configured polymeric valve member 125b. The valve 125b is normally biased into a closed positioned, but can be opened in two ways.

In the first way, a carafe located below the filter basket can impinge on the inverted, dome shaped actuator 122. The actuator 122 has a central shaft 124 that carries the valve member 125b. The actuator 122 also has a central discharge opening or spout 123. A properly configured carafe will thus impinge on the underside of the dome actuator 122 and cause the valve member 125b to cooperate by unseating from the valve seat 125a. Brewed coffee will then flow through the central opening of the valve seat 125a, into the interior of the dome shaped actuator 122 and through the discharge opening 123. The actuator 122 is braced to return to the closed position as shown in FIG. 13 when the carafe is removed.

The valve assembly 121 can also be operated in a second way. When a user desires a single serve of coffee and the carafe is not present, the user can activate a switch that directly or indirectly operates an electric motor 136. As will be explained, the motor operates to open and close the basket's valve. As shown in FIGS. 12 and 13, the inverted dome shaped actuator 122 is carried by a supporting frame 126 that is attached to the underside of the filter basket by a hinge arrangement 127. The frame 126 is located above a transverse lever 140. One end of the lever 140 is affixed to the underside of the filter basket 120 by a pivot or hinge. The other end of the lever 140 has an opening 140 through which passes an actuating rod 129. The lower portion of the actuating rod 129 terminates in an enlarged stop 141. The actuating rod 129 is supported by a journal 130 that is carried (for example) by the filter basket 120. The actuator rod 129 terminates in an enlarged head 132. A compression spring 131 is located between the journal 130 and the head 132. Thus, the actuating rod 129 is biased upwardly, in a way that would lift the transverse lever 140 and open the valve, in the absence of the restraint imposed by a mechanical limit. In this example, the mechanical limit comprises a revolving cam disc 133 onto which the rod impinges. The cam disk 133 has an internal gearing 134 that is driven by a pinion gear 135 that is attached to the shaft of the electric motor 136. Note that the cam ring 133 includes a recess 137. When the cam ring is rotated into a position that allows the actuating rod's head 132 to enter the recess 137, the action of the spring 131 lifts the lever 140 and thus opens the valve assembly 121 to permit coffee to exit the discharge opening 123. Further rotation of the cam ring 133 drives the actuator rod 129 in the direction of the lever 140. This in turn allows the bias mechanism associated with the actuator dome 122 to operate. This permits the valve member 125b to seal against the conical seat 125a. In preferred embodiments, the actuator rod 129 is angled with respect to the lever 140. The opening 145 in the free end of the transverse lever is also angled to accommodate the rod 129 and slightly larger than the diameter of the actuating rod 129. This allows a certain amount of misalignment between the rod and the lever and also allows the lever to operate independently of the rod 129 when it is acted upon by a carafe impinging on the actuator dome 122. This arrangement also allows the motor and cam disk to remain stationary within the chassis of the coffee maker while the basket assembly is movable on a sliding drawer so that the filter basket, or its filter etc. is serviced or cleaned by the user and then returned to a brewing position where the actuator rod impinges on the cam disk.

It can also be observed from FIG. 12, that the cam disc 133 includes an eccentric opening 145. This opening allows coffee grinds to pass from a coffee loading chute, into the filter basket 120 when the opening 145 is properly aligned by the operation of the electric motor 136. When the opening 145 is not aligned with this chute (not shown) the grounds are prevented from entering the coffee basket 120.

In particularly preferred embodiments, the operation of the electric motor 136, when in the "single serve" setting, delays the opening of the valve assembly until such time as the grounds in the filter contained in the filter basket have been exposed to hot water and brewed sufficiently. After a predetermined delay, the motor operates to unseat the valve member 125*b* whereupon the contents of the filter basket 120 are discharged. Because of the aforementioned brewing interval or delay, it is not necessary to partially unblock the valve assembly 121 and thus a single serve can be discharged at effectively the same rate as a multiple serve.

While the present invention has been disclosed with reference to particular details of construction, these should be understood as having been provided by way of example and not as limitations to the scope or spirit of the invention.

What is claimed is:

1. A filter basket assembly device for a drip filter coffee maker having both a carafe mode and a single serve mode, the device comprising:
   a filter basket body for holding a coffee filter, the body having a lower surface in which there is a through opening comprising a valve seat;
   a valve member carried by a valve stem cooperating with the valve seat, the valve member being biased into a normally closed position with respect to the valve seat;
   an actuator resides below the through opening and is coupled to the valve stem;
   the actuator is shaped and adapted to cooperate with a carafe, such that when a carafe is presented to the drip filter coffee maker, that carafe impinges on the actuator to thereby lift the valve member for operating in the carafe mode and allowing continuous fluid flow out of the through opening;
   a lever is hinged with respect to the body, the lever supports the actuator such that hinged movement of the lever with respect to the body causes activation of the actuator to open the valve member with respect to the valve seat; and
   wherein, in the single serve mode, automatic activation of the actuator is delayed until grounds in the coffee filter have sufficiently brewed in hot water for a predetermined delay; and
   wherein the actuator can be independently activated by the carafe to enable a the continuous fluid flow out of the through opening to a presented carafe when in carafe mode and the lever to enable an automatic delayed discharged of a single serve of drip filter coffee when in single serve mode.

2. The device of claim 1, wherein:
   the actuator has one or more coffee discharge openings in it.

3. The device of claim 2, wherein:
   the actuator has a stem around which are formed the one or more discharge openings for dispensing brewed coffee.

4. The device of claim 1, wherein:
   an electric motor drives operation of the lever.

5. The device of claim 1, wherein:
   the valve seat and valve member are conical.

6. The device of claim 1, wherein:
   the lever is carried by a hinge that is affixed to the basket.

7. The device of claim 1, wherein:
   the actuator has an inverted dome shape.

8. The device of claim 2, wherein:
   the actuator has an inverted dome shape.

9. The device of claim 1, further comprising:
   a carafe adapted to cooperate with the actuator so as to lift the valve member when the carafe impinges on the actuator.

* * * * *